(12) United States Patent
Moses et al.

(10) Patent No.: US 9,437,889 B2
(45) Date of Patent: Sep. 6, 2016

(54) POWERING A FUEL CELL STACK DURING STANDBY

(75) Inventors: Robert J. Moses, Farmington, NY (US); Balasubramanian Lakshmanan, Pittsford, NY (US); Daniel T. Folmsbee, Victor, NY (US); Daniel I. Harris, Honeoye Falls, NY (US); Swaminatha P. Kumaraguru, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 663 days.

(21) Appl. No.: 13/612,325

(22) Filed: Sep. 12, 2012

(65) Prior Publication Data
US 2014/0072893 A1    Mar. 13, 2014

(51) Int. Cl.
| | | |
|---|---|---|
| H01M 8/04 | (2016.01) | |
| H01M 8/24 | (2016.01) | |
| H01M 16/00 | (2006.01) | |

(52) U.S. Cl.
CPC ....... *H01M 8/04552* (2013.01); *H01M 8/0488* (2013.01); *H01M 8/04223* (2013.01); *H01M 8/04447* (2013.01); *H01M 8/04455* (2013.01); *H01M 8/04753* (2013.01); *H01M 8/04798* (2013.01); *H01M 8/04873* (2013.01); *H01M 16/006* (2013.01); *H01M 8/04955* (2013.01); *Y02E 60/50* (2013.01)

(58) Field of Classification Search
CPC ............... H01M 8/04552; H01M 8/04223; H01M 8/04447; H01M 8/04455; H01M 8/0488; H01M 8/04955; H01M 8/04753; H01M 8/04873; H01M 8/04798; H01M 16/006

USPC .......................................... 429/429, 432, 23
See application file for complete search history.

(56) References Cited

U.S. PATENT DOCUMENTS

| | | | | |
|---|---|---|---|---|
| 3,542,597 | A * | 11/1970 | Klunder et al. ............... | 429/431 |
| 2002/0091475 | A1* | 7/2002 | Hashimoto et al. ........... | 701/48 |
| 2003/0022041 | A1* | 1/2003 | Barton et al. .................. | 429/23 |
| 2004/0137292 | A1* | 7/2004 | Takebe et al. .................. | 429/23 |
| 2004/0247955 | A1* | 12/2004 | Oyabe et al. .................. | 429/13 |
| 2006/0147770 | A1 | 7/2006 | Krause | |
| 2009/0284214 | A1* | 11/2009 | Arthur et al. ................. | 320/101 |
| 2011/0059375 | A1* | 3/2011 | Buechi et al. ................ | 429/415 |
| 2011/0087389 | A1 | 4/2011 | Burleigh | |
| 2013/0059319 | A1* | 3/2013 | Erbeldinger et al. ........... | 435/15 |
| 2013/0164645 | A1* | 6/2013 | Takaichi et al. ............... | 429/432 |

FOREIGN PATENT DOCUMENTS

WO    WO 2011148466 A1 * 12/2011

OTHER PUBLICATIONS

The Physics Classroom—Electric Potential Difference (date unknown).*

* cited by examiner

*Primary Examiner* — Miriam Stagg
*Assistant Examiner* — Anne R Dixon
(74) *Attorney, Agent, or Firm* — John A. Miller; Miller IP Group, PLC

(57) ABSTRACT

A system and method for limiting voltage cycling of a fuel cell stack during a stand-by mode by providing power from a battery to the stack while the stack is turned off. The method includes monitoring the voltage of each of the fuel cells in the fuel cell stack and determining an average cell voltage of the fuel cells in the fuel cell stack. The method also determines whether the average cell voltage of the fuel cells in the fuel cell stack has fallen below a predetermined voltage value and, if so, applies a voltage potential to the fuel cell stack to increase the average cell voltage above the predetermined voltage value.

19 Claims, 2 Drawing Sheets

POWERING A FUEL CELL STACK DURING STANDBY

BACKGROUND OF THE INVENTION

1. Field of the Invention

This invention relates generally to a system and method for extending the life of the electrode catalyst in a fuel cell stack and, more particularly, to a system and method for extending the life of the electrode catalyst in a fuel cell stack by maintaining the stack potential above a certain value during a system stand-by mode to prevent or limit stack voltage cycling.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte there between. The anode receives hydrogen gas and the cathode receives oxygen or air. The hydrogen gas is dissociated at the anode catalyst to generate free protons and electrons. The protons pass through the electrolyte to the cathode. The protons react with the oxygen and the electrons at the cathode catalyst to generate water. The electrons from the anode cannot pass through the electrolyte, and thus are directed through a load to perform work before being sent to the cathode.

Proton exchange membrane fuel cells (PEMFC) are a popular fuel cell for vehicles. A PEMFC generally includes a solid polymer electrolyte proton conducting membrane, such as a perfluorosulfonic acid membrane. The anode and cathode typically, but not always, include finely divided catalytic particles, usually a highly active catalyst such as platinum (Pt) that is typically supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode reactant input gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant input gas that flows into the anode side of the stack.

A fuel cell stack typically includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow fields are provided on the anode side of the bipolar plates that allow the anode reactant gas to flow to the respective MEA. Cathode gas flow fields are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

It has been discovered that a typical fuel cell stack will have a voltage loss or degradation over the lifetime of the stack. It is believed that the fuel cell stack degradation is, among others, a result of voltage cycling of the stack. Voltage cycling occurs when the platinum catalyst particles used to enhance the electro-chemical reaction transition between an oxidized state and a non-oxidized state, which causes dissolution of the particles. When the platinum particles transition between the non-oxidized or metal state and an oxidized state, oxidized ions in the platinum are able to move from the surface of the MEA towards the membrane and probably into the membrane. When the particles convert back to the metal state, they are not in a position to assist in the electro-chemical reaction, reducing the active catalyst surface and resulting in the voltage degradation of the stack.

Oxidation of platinum particles in a fuel cell as a result of voltage cycling creates a passivation layer in the cell electrode that prevents the particles from going into solution and being absorbed into the membrane. In other words, oxidation of the platinum particles in a fuel cell reduces the possibility of a reduction in catalyst surface area, which reduces cell degradation. Although the discussion herein refers to the catalyst as being platinum, those skilled in the art will readily understand that other metals can be used as a catalyst and that the catalyst may be in various concentrations, particle sizes, support material, etc.

If the voltage of the fuel cell stack is less than about 0.9 volts, the platinum particles are not oxidized and remain a metal. When the voltage of the fuel cell stack goes above about 0.9 volts, the platinum crystals begin to oxidize. A low load on the stack may cause the voltage output of the fuel cell stack to go above 0.9 volts. The 0.9 volts corresponds to a current density of about 0.2 A/cm$^2$, depending on the power density of the MEA, where a current density above this value does not change the platinum oxidation state. The oxidation voltage threshold may be different for different stacks and different catalysts.

Many factors influence the relative loss in surface area of the platinum particles relating to voltage cycling, including peak stack voltage, temperature, stack humidification, voltage cycling dynamics, etc. Lower stack voltage set-points offer greater protection against degradation, but higher stack voltage set-points provide increased system efficiency. Thus, the control for various fuel cell systems often requires the stack to at least operate at a minimum power level so that, in at least one case, the cell voltages are prevented from rising too high because frequent voltage cycles to high voltage can cause a reduction in the active platinum surface area of the cathode and anode electrodes, as discussed above.

Typically, in known fuel cell systems, a fixed voltage limit is used to set the stack minimum power level to prevent unwanted voltage cycling. For example, a typical voltage suppression strategy may use a fixed voltage set-point, such as 850-900 mV, and prevent the stack voltage from rising above that value. If the fuel cell power controller is not requesting power, or is requesting minimal power, the power generated by the stack necessary to maintain the cell voltage levels at or below the fixed voltage set-point is provided to certain sources where the energy is stored or dissipated. For example, the excess power may be used to charge a high voltage battery in a fuel cell system vehicle.

U.S. Patent Application Publication No. US 2006/0147770 A1, published Jul. 6, 2006, titled, Reduction of Voltage Loss Caused by Voltage Cycling by Use of A Rechargeable Electric Storage Device, assigned to the assignee of this application and herein incorporated by reference, discloses a fuel cell system that charges a vehicle battery in order to maintain the cell voltage below a predetermined fixed voltage set-point.

When a fuel cell system on a vehicle is in an idle mode, such as when the vehicle is stopped at a stop light, where the fuel cell stack is not generating power to operate system devices, air and hydrogen are generally still being provided to the fuel cell stack, and the stack is generating output power. This power is typically used to recharge the battery until an upper state of charge (SOC) limit of the battery is reached, where if the battery is charged beyond this upper limit, the battery may be damaged. When this SOC limit is reached, the battery load on the stack is removed, which increases the stack voltage, but causes voltage cycling referred to above that decrease the life of the stack. If the fuel cell system is turned off during the idle condition, then the problem of providing a load on the stack when the battery has reached its maximum SOC does not need to be addressed. Also, providing hydrogen to the fuel cell stack when it is in the idle mode is generally wasteful because operating the stack under this condition is not producing very much useful work, if any.

For these and other fuel cell system operating conditions, it may be desirable to put the system in a stand-by mode where the system is consuming little or no power, the quantity of hydrogen fuel being used is minimal and the system can quickly recover from the stand-by mode so as to increase system efficiency and reduce system degradation. U.S. patent application Ser. No. 12/723,261, titled, Standby Mode for Optimization of Efficiency and Durability of a Fuel Cell Vehicle Application, filed Mar. 12, 2010, assigned to the assignee of this application and herein incorporated by reference, discloses one process for putting a fuel cell system on a vehicle in a stand-by mode to conserve fuel.

When a fuel cell stack goes into the stand-by mode and is turned off, the voltage on the stack drops to zero, and when the stand-by mode is over and the stack is restarted, the voltage on the stack is increased. Thus, the above-described voltage cycling occurs that will reduce the performance of the catalyst based on the number of times the stand-by mode is entered and ended. It is possible to limit the load on the stack in the early time that the stack is in the stand-by to limit the voltage cycling. However, additional steps can be taken to limit loss of catalyst.

SUMMARY OF THE INVENTION

In accordance with the teachings of the present invention, a system and method are disclosed for limiting voltage cycling of a fuel cell stack during a stand-by mode by providing power from a battery to the stack while the stack is turned off. The method includes monitoring the voltage of each of the fuel cells, or a group of cells, in the fuel cell stack and determining an average cell voltage of the fuel cells in the fuel cell stack. The method also determines whether the average cell voltage of the fuel cells in the fuel cell stack has fallen below a predetermined voltage value and, if so, applies a voltage potential to the fuel cell stack to increase the average cell voltage above the predetermined voltage value.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for limiting voltage cycling of a fuel cell stack during a stand-by mode is merely exemplary, and is in no way intended to limit the invention or its applications or uses. For example, the system and method of the invention described herein has particular application for a fuel cell system on a vehicle. However, as will be appreciated by those skilled in the art, the system and method of the invention may have other applications.

Figure 1:
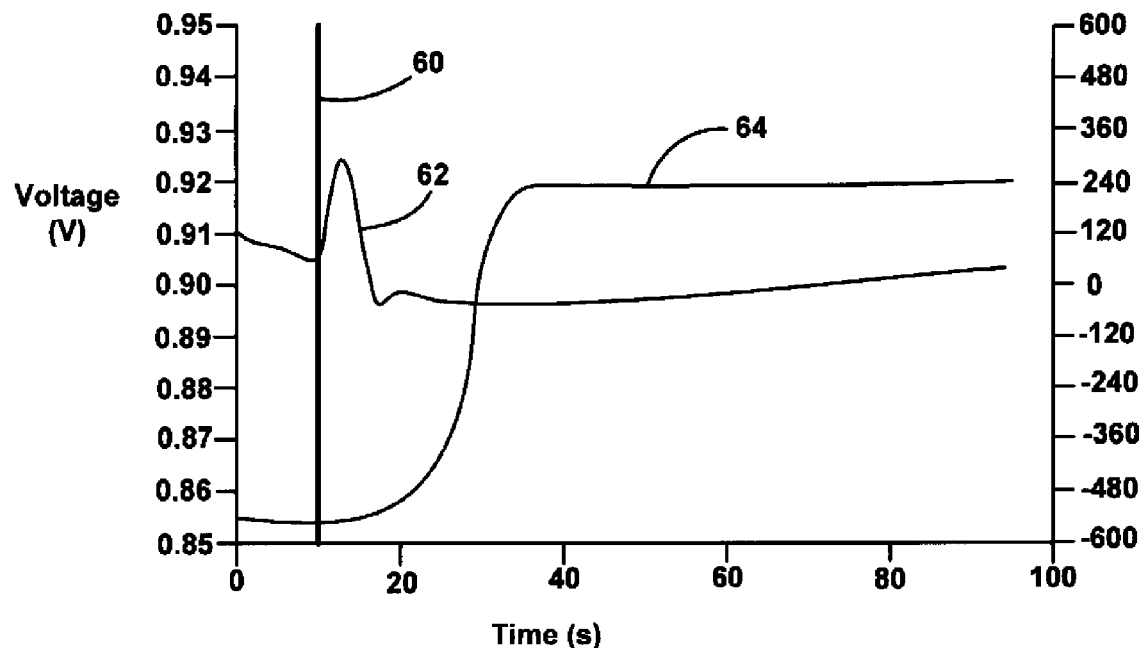
FIG. 1 is a graph with time on the horizontal axis, average cell voltage on the left vertical axis and stack power on the right vertical axis showing a relationship between average cell voltage and power provided to a fuel cell stack by a battery.

The present invention proposes a technique for providing power to a fuel cell stack during a stand-by mode to prevent the stack voltage from falling below a predetermined threshold voltage where voltage cycling can occur. FIG. 1 is a graph with time on the horizontal axis, average cell voltage on the left vertical axis and stack power on the right vertical axis. Line 60 represents the time when the stand-by mode is initiated and air flow from the cathode compressor is stopped or the compressor airflow is by-passed around the stack. When the load on the stack is removed, the average cell voltage represented by line 62 initially increases as the reactants within the stack are consumed. Soon after the stand-by mode is initiated and the reactants have been consumed, the average cell voltage begins to fall. Once the average cell voltage reaches a voltage cycling threshold, for example, 0.9 volts, power from, for example, a battery is applied to the fuel cell stack, represented by line 64, to cause the average cell voltage to increase above the threshold over time. The threshold voltage of 0.9 volts is a voltage that has been shown to prevent voltage cycling on the stack if the stack voltage is maintained above that voltage. However, other fuel cell stacks and fuel cell systems may require a different voltage cycling threshold.

Figure 2:
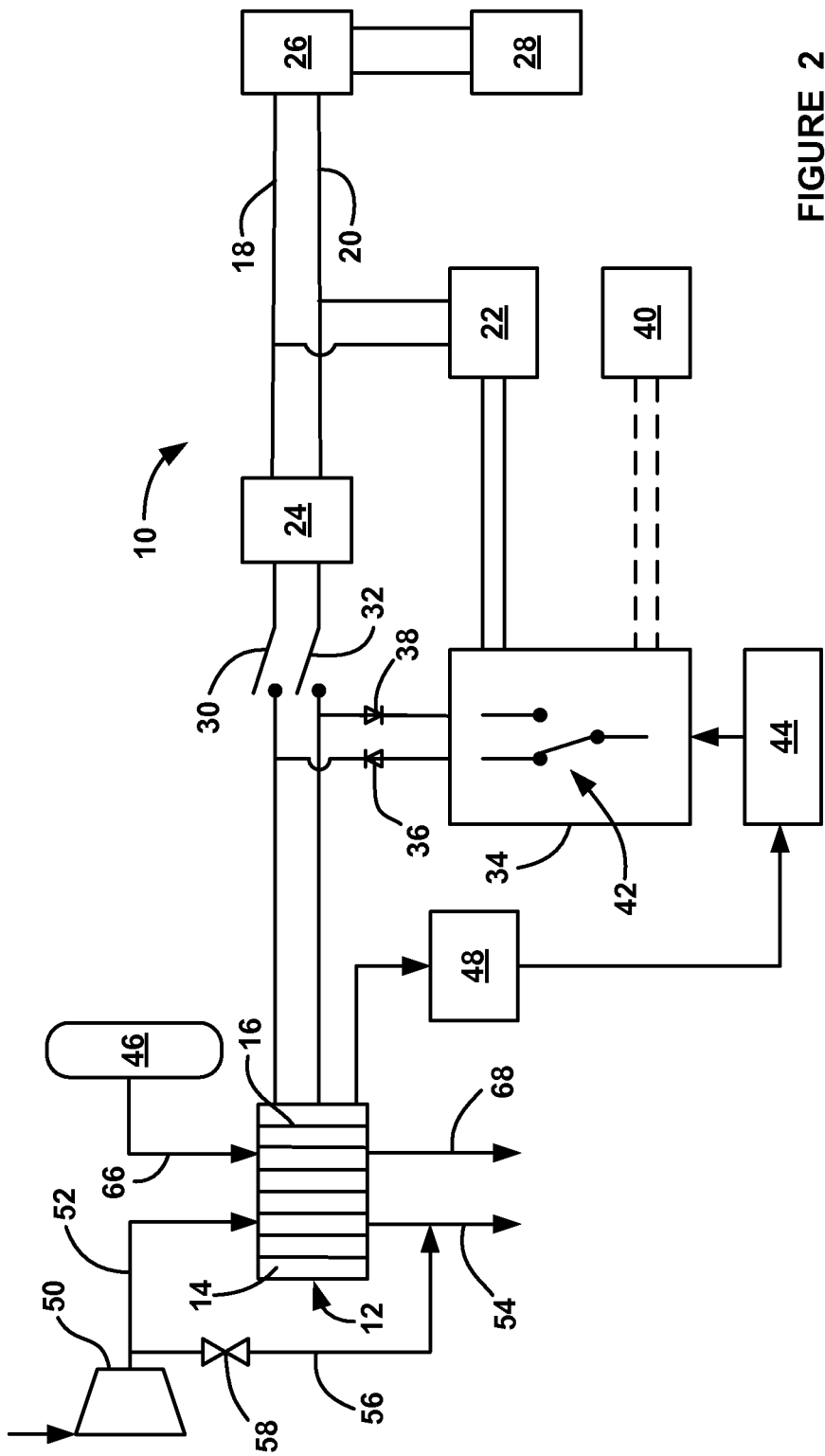
FIG. 2 is a block diagram of a fuel cell system including a battery for providing a voltage potential to a fuel cell stack during a stand-by mode.

FIG. 2 is a simplified block diagram of a fuel cell system 10 including a fuel cell stack 12 that has particular application as a vehicle fuel cell system. The fuel cell stack 12 includes a number of fuel cells 14 suitable for the intended purpose, where anode and cathode electrodes 16 are provided at opposite sides of the fuel cells 14. A hydrogen source 46 provides hydrogen gas to the anode side of the fuel cell stack 12 on anode input line 66 and anode exhaust is output from the stack 12 on anode exhaust line 68. An air compressor 50 provides air to the cathode side of the fuel cell stack 12 on cathode input line 52 and cathode exhaust is output from the fuel cell stack 12 on cathode exhaust line 54. A cathode by-pass line 56 is provided around the stack 12 and includes a by-pass valve 58 for controlling whether the cathode air from the compressor 50 travels around or through the stack 12. The cathode sub-system and the anode sub-system in the fuel cell system 10 would include various valves, injectors, hoses, etc. provided in various configurations that are not shown here, and are not necessary for a proper understanding of the invention.

A voltage monitoring circuit 48 monitors the stack voltage, measures the minimum and maximum cell voltages of the fuel cells 14 and calculates an average cell voltage. The voltage monitoring circuit 48 can be any device suitable for the purposes discussed herein many of which are known to those skilled in the art. A system controller 44 controls the operation of the fuel cell system 10 and receives the various voltage values from the voltage monitoring circuit 48.

The fuel cell system 10 also includes a high voltage electrical bus represented here by positive and negative voltage lines 18 and 20, respectively, that are electrically coupled to the fuel cell stack 12. The fuel cell system 10 includes a high voltage battery 22 also electrically coupled to the bus lines 18 and 20 that supplements the power provided by the fuel cell stack 12 in a manner that is well understood by those skilled in the art. The system 10 also includes a DC/DC boost converter 24 electrically coupled to the high voltage bus lines 18 and 20 between the fuel cell stack 12 and the high voltage battery 22 that provides DC voltage matching also in a manner well understood by those skilled in the art. An inverter 26 is electrically coupled to the high voltage bus lines 18 and 20 to convert the DC current provided thereon to an AC signal suitable to operate an AC traction motor 28 to propel the vehicle. The operation of an inverter for this purpose is also well understood by those skilled in the art. Contactor switches 30 and 32 are provided in the lines 18 and 20, respectively, to disconnect the fuel cell stack 12 from the rest of the electrical system of the fuel cell system 10.

The fuel cell system 10 also includes an electrical converter 34 electrically coupled to the high voltage bus lines 18 and 20 between the contactor switches 30 and 32 and the fuel cell stack 12. The converter 34 is controlled by the controller 44 in the manner as discussed herein. When the fuel cell system 10 is put into the stand-by mode, the fuel cell stack 12 is turned off and the stack voltage begins to fall, as discussed above. Since it is desirable to maintain the cell voltages above the desired oxidation threshold voltage, here 0.9 volts, the electrical converter 34 is used to provide a potential to the bus lines 18 and 20 so that the voltage on the stack 12 does not fall below the minimum desired voltage. Diodes 36 and 38 can be provided in the lines connecting the bus lines 18 and 20 to the converter 34 that prevent electrical flow from the bus lines 18 and 20 to the converter 34. When the stack contactor switches 30 and 32 are open and the electrical converter 34 is turned on, by, for example, a switching network 42, then the potential is added to the bus lines 18 and 20 and directly to the stack 12. It may not be necessary to open the contactor switches 30 and 32 when the system 10 is in the stand-by mode and the electrical converter 34 is turned on because the load placed on the bus lines 18 and 20 may not be large enough to suppress the battery potential below the stack potential, where the boost converter 24 can be electrically connected to the stack 12 when the voltage is being boosted by the converter 34.

In one embodiment, the electrical converter 34 is a power converter that converts the high voltage battery power from the battery 22 to a voltage potential suitable for the process as discussed herein. In an alternate embodiment, the electrical converter 34 can be a boost converter that converts a low voltage, typically 12 volts, from a 12 volt battery 40 to a high enough voltage potential to provide the oxidation. The low voltage battery 40 drives auxiliary low power loads on the vehicle, such as lights, climate control devices, radio, etc. Power converters and boost converters suitable for this purpose are well known to those skilled in the art and are readily available.

Although in this embodiment the determination of when to provide the power from the battery 22 is based on the average cell voltage, other factors may also be used to determine when to provide battery power and when not to. For example, it may also be desirable to monitor the maximum cell voltage so that it does not exceed some predetermined maximum value when battery power is being provided to the stack 12 that may otherwise cause damage to that cell. Likewise, the voltage of the minimum cell may fall below some value that is below the threshold voltage, where it may be desirable to provide battery power to the stack 12 when the minimum cell voltage reaches some low voltage threshold, but where the average cell voltage still has not reached the threshold voltage. Further, it may be desirable to monitor the reactant concentrations in the fuel cell stack 12 to determine when to provide the battery power. For example, if there is an uneven distribution of reactants, such as oxygen, in the fuel cell stack 12, applying power from the battery 22 may cause cells associated with the higher oxygen levels to increase above some high threshold possibly causing cell damage. As would be well understood by those skilled in the art, various techniques are known in the art to determine the concentration of both the cathode air and hydrogen gas in the fuel cell stack 12, including, but not limited to, various reactant concentration models and concentration sensors.

Figure 3:
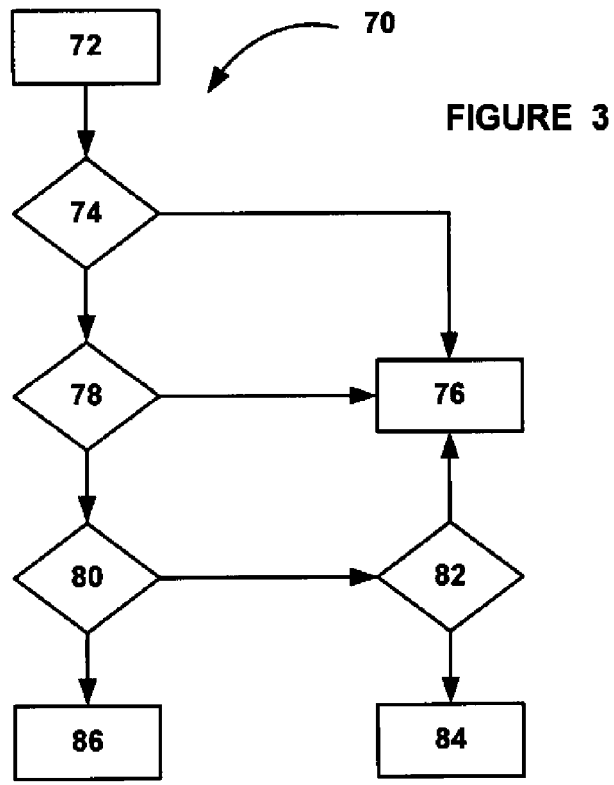
FIG. 3 is a flow chart diagram showing a process for providing power to a fuel cell stack during a stand-by mode for preventing the stack voltage from falling below a predetermined level.

FIG. 3 is a flow chart diagram 70 showing a process as described above for maintaining the voltage of the fuel cell stack 12 above a desired voltage threshold to prevent or reduce voltage cycling. The algorithm for maintaining stack voltage is started at box 72, which may be in response to any suitable vehicle operating condition, such as entering a stand-by mode, as discussed above, where the fuel cell stack 12 is turned off and the compressor 50 is shut down. Once this sequence is initiated, the algorithm then determines if the average cell voltage or the minimum cell voltage is below a set voltage threshold at decision diamond 74, and if not, the stack voltage is not low enough to add additional stack potential and the voltage is allowed to fall at box 76. Alternately, the decision to determine if the average cell voltage or the minimum cell voltage is below a set voltage threshold could be separate decisions. If the average cell voltage has fallen below the voltage threshold at decision diamond 74, then the algorithm determines whether the maximum cell voltage is below a predetermined maximum voltage at decision diamond 78. As discussed above, even though the average cell voltage is below the voltage threshold where voltage cycling can occur, it still may be better for the fuel cell stack 12 if the additional power from the battery 22 is not provided to the stack 12 if the voltage of one of the cells 14 is above a predetermined maximum voltage where that cell could be damaged. Thus, if the maximum cell voltage is too high, the algorithm again allows the stack voltage to fall at the box 76 because adding voltage to the stack 12 if the maximum cell voltage is too high could be detrimental.

If the maximum cell voltage is below the maximum voltage at the decision diamond 78, then the algorithm determines if the reactant concentrations in the stack 12 are acceptable at the decision diamond 80. As discussed above, if the distribution of the reactants in the stack 12, including both cathode air and hydrogen gas, is such that the reactants create higher voltages on some cells, it may be desirable to not provide additional power from the battery 22 even though the average cell voltage is below the threshold voltage. If the algorithm determines that the reactant concentration is not acceptable at the decision diamond 80, the algorithm determines whether it is desirable or possible to add cathode air or hydrogen fuel at decision diamond 82. If it is not desirable to add reactants at the decision diamond 82, then the algorithm again allows the stack voltage to fall at the box 76. If it is desirable to add reactants at the decision diamond 82, then the algorithm adds the reactants at box 84. If the algorithm determines that the reactant concentrations are acceptable at decision diamond 80, then the algorithm provides voltage to the stack 12 in the manner discussed above at box 86.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for maintaining a voltage of a fuel cell stack in a fuel cell system above a desired voltage value, said fuel cell stack including a plurality of fuel cells, said method comprising:
    monitoring the voltage of each of the fuel cells in the fuel cell stack;
    determining an average voltage of the voltages of each of the fuel cells in the fuel cell stack;
    determining whether the average voltage of the fuel cells in the fuel cell stack has fallen below a first predetermined voltage value;
    applying a voltage potential to the fuel cell stack to increase the average voltage above the first predetermined voltage value if the average voltage has fallen below the first predetermined voltage value; and
    determining whether the voltage of the fuel cell having a maximum cell voltage is above a second predetermined voltage value, wherein applying the voltage potential to the fuel cell stack includes applying the voltage potential to the fuel cell stack only if the maximum cell voltage is below the second predetermined voltage value regardless of whether the average voltage is below the first predetermined voltage value.

2. The method according to claim 1 wherein applying the voltage potential to the fuel cell stack includes applying the voltage potential from a battery.

3. The method according to claim 2 wherein providing the voltage potential to the fuel cell stack from the battery includes applying the voltage potential to the fuel cell stack from the battery through an electrical converter.

4. The method according to claim 1 further comprising determining whether the voltage of the fuel cell having a minimum cell voltage is below a third predetermined voltage value, wherein applying the voltage potential to the fuel cell stack includes applying the voltage potential to the fuel cell stack if the minimum cell voltage is below the third predetermined voltage value regardless of whether the average voltage is above the first predetermined voltage value.

5. The method according to claim 1 further comprising determining whether reactant concentrations in the fuel cell stack are at a predetermined acceptable level, and if not, preventing applying the voltage potential to the fuel cell stack regardless of whether the average voltage is below the first predetermined voltage value.

6. The method according to claim 5 further comprising determining whether reactants can be added to the fuel cell stack if it is determined that the reactant concentrations are not at the predetermined acceptable level.

7. The method according to claim 5 wherein determining whether reactant concentrations in the fuel cell stack are at the predetermined acceptable level includes determining whether both cathode air and anode hydrogen gas concentrations are at the predetermined acceptable level.

8. The method according to claim 1 wherein the method is performed when the fuel cell system is in a stand-by mode.

9. The method according to claim 1 wherein the first predetermined voltage value is about 0.9 volts.

10. A method for maintaining a voltage of a fuel cell stack in a fuel cell system above a desired voltage value during a fuel cell system stand-by mode, said fuel cell stack including a plurality of fuel cells, said fuel cell system including a battery, said method comprising:
    monitoring the voltage of each of the fuel cells in the fuel cell stack;
    determining an average voltage of the voltages of each of the fuel cells in the fuel cell stack;
    determining a maximum cell voltage of the voltage of the fuel cell having the highest voltage;
    determining a minimum voltage of the fuel cell having the lowest voltage;
    determining whether the average voltage of the fuel cells in the fuel cell stack has fallen below a first predetermined voltage value;
    determining whether the maximum cell voltage is greater than a second predetermined voltage value;
    determining whether the minimum cell voltage is below a third predetermined voltage value; and
    applying a voltage potential to the fuel cell stack to increase the average voltage above the first predetermined voltage value if the average voltage has fallen below the first predetermined voltage value, wherein applying the voltage potential to the fuel cell stack includes applying the voltage potential to the fuel cell stack only if the maximum cell voltage is below the second predetermined voltage value regardless of whether the average voltage is below the first predetermined voltage value and applying the voltage potential to the fuel cell stack if the minimum cell voltage is below the third predetermined voltage value regardless of whether the average voltage is above first predetermined voltage value.

11. The method according to claim 10 further comprising determining whether reactant concentrations in the fuel cell stack are at a predetermined acceptable level, and if not, preventing applying the voltage potential to the fuel cell stack regardless of whether the average voltage is below the first predetermined voltage value.

12. The method according to claim 11 further comprising determining whether reactants can be added to the fuel cell stack if it is determined that the reactant concentrations are not at the predetermined acceptable level.

13. A control system with a controller programmed for maintaining a voltage of a fuel cell stack in a fuel cell system above a desired voltage value, said fuel cell stack including a plurality of fuel cells, said system comprising:

means for monitoring the voltage of each of the fuel cells in the fuel cell stack that includes using a voltage monitoring circuit;

means for determining an average voltage of the voltages of each of the fuel cells in the fuel cell stack that includes using the voltage monitoring circuit;

means for determining whether the average voltage of the fuel cells in the fuel cell stack has fallen below a first predetermined voltage value; and means for applying a voltage potential to the fuel cell stack that includes using the controller programmed to use the voltage potential to increase the average voltage above the first predetermined voltage value if the average voltage has fallen below the first predetermined voltage value.

14. The control system according to claim 13 wherein the means for applying the voltage potential to the fuel cell stack applies the voltage potential from a battery.

15. The control system according to claim 13 further comprising means for determining whether the voltage of the fuel cell having a maximum cell voltage is above a second predetermined voltage value, wherein the means for applying the voltage potential to the fuel cell stack applies the voltage potential to the fuel cell stack only if the maximum cell voltage is below the second predetermined voltage value regardless of whether the average voltage is below the first predetermined voltage value.

16. The control system according to claim 13 further comprising means for determining whether the voltage of the fuel cell having a minimum cell voltage is below a third predetermined voltage value, wherein the means for applying the voltage potential to the fuel cell stack applies the voltage potential to the fuel cell stack if the minimum cell voltage is below the third predetermined voltage value regardless of whether the average voltage is above the first predetermined voltage value.

17. The control system according to claim 13 further comprising means for determining whether reactant concentrations in the fuel cell stack are at a predetermined acceptable level, and if not, preventing the means for applying from applying the voltage potential to the fuel cell stack regardless of whether the average voltage is below the first predetermined voltage value.

18. The control system according to claim 17 further comprising means for determining whether reactants can be added to the fuel cell stack if it is determined that the reactant concentrations are not at the predetermined acceptable level.

19. The control system according to claim 13 wherein the control system maintains the voltage of the fuel cell stack when the fuel cell system goes into a stand-by mode.

\* \* \* \* \*